United States Patent [19]
Parkins

[11] 3,926,484
[45] Dec. 16, 1975

[54] SPINDLE AND BEARING ASSEMBLIES
[75] Inventor: Derek Ray Parkins, Barton-le-Clay, England
[73] Assignee: SKF Industrial Trading and Development Company B.V., Jutphaas, Netherlands
[22] Filed: Oct. 23, 1973
[21] Appl. No.: 408,893

[30] Foreign Application Priority Data
Oct. 23, 1972 United Kingdom............... 48746/72

[52] U.S. Cl................................. 308/174; 308/152
[51] Int. Cl.² ........................................ F16C 19/04
[58] Field of Search ........... 308/173, 149, 150, 152, 308/174

[56] References Cited
UNITED STATES PATENTS

| | | |
|---|---|---|
| 2,982,587 | 5/1961 | Fraser et al......................... 308/174 |
| 3,167,363 | 1/1965 | Murphy ............................. 308/174 |
| 3,302,986 | 2/1967 | Grolman et al..................... 308/174 |

Primary Examiner—M. Henson Wood, Jr.
Assistant Examiner—Richard A. Bertsch
Attorney, Agent, or Firm—Daniel M. Rosen

[57] ABSTRACT

A spindle and bearing assembly including a row of balls and a row of rollers which are spaced apart from each other axially along the spindle and have a common outer bearing ring, the balls being arranged to roll in a groove in the spindle, or in a groove in an inner bearing ring fixed on the spindle, and in a groove in the outer bearing ring, wherein the balls and the rollers are provided with cages which are interconnected in such a way that the roller cage has no substantial freedom of movement in an axial direction relative to the ball cage so that the roller cage and hence the rollers are axially located within the outer bearing ring.

10 Claims, 2 Drawing Figures

U.S. Patent   Dec. 16, 1975   3,926,484
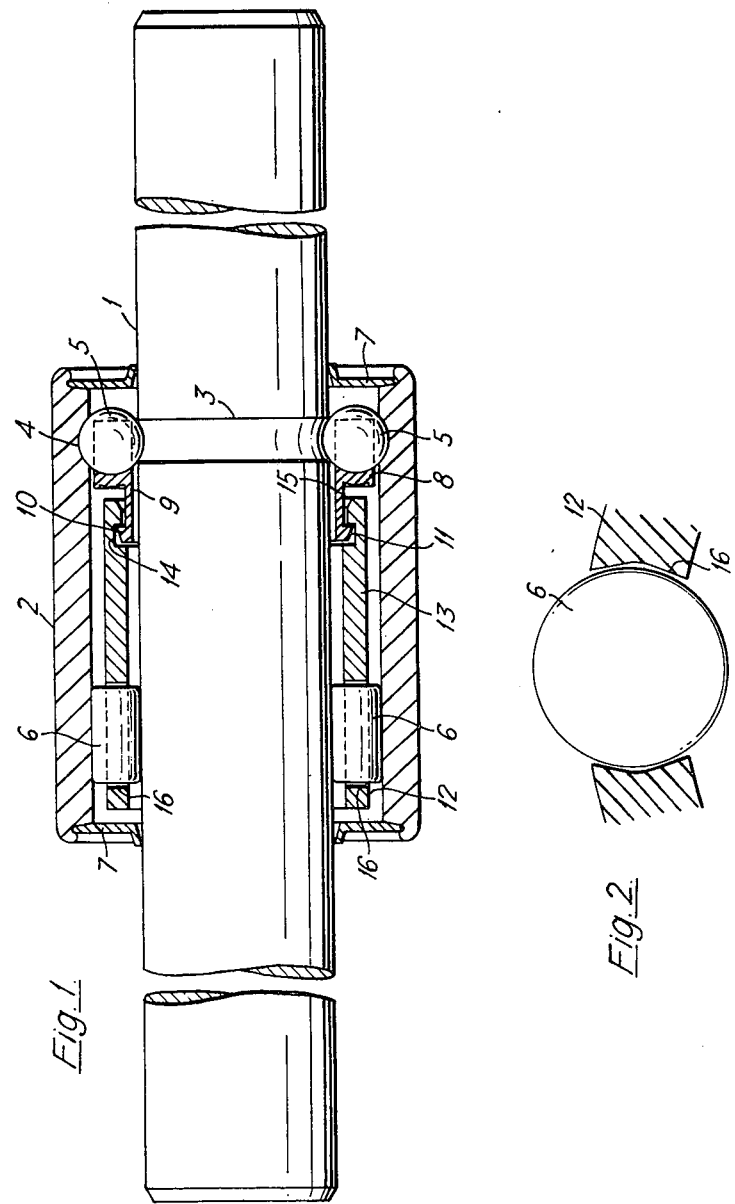

3,926,484

SPINDLE AND BEARING ASSEMBLIES

This invention relates to spindle and bearing assemblies such as are used, for example, in water pumps of motor vehicles and in washing machines.

Heavy duty assemblies which are intended for use with radial spindle loads greater than can satisfactorily be carried by a single deep-groove ball bearing or a pair of such bearings commonly comprise a row of balls and a row of rollers which are spaced apart from each other axially along the spindle and have a common outer bearing ring. The balls roll in a groove in the spindle, or in a groove in an inner bearing ring fixed on the spindle, and in a groove in the outer bearing ring and thus, when the outer bearing ring is fixed in position, both the balls and the spindle are located in an axial direction.

Problems still occur however with the axial location of the rollers. This may be effected by providing a groove in the spindle or in the outer bearing ring in which the rollers run, or by providing recesses in the spindle or in the outer bearing ring in which circlips are fitted. These methods of location are not however entirely satisfactory as they generally involve manufacturing and assembly difficulties and the resultant assembly becomes expensive.

The aim of the present invention is to overcome these problems and provide a simple arrangement for the axial location of the rollers.

To this end, according to this invention, in a spindle and bearing assembly including a row of balls and a row of rollers which are spaced apart from each other axially along the spindle and have a common outer bearing ring, the balls being arranged to roll in a groove in the spindle, or in a groove in an inner bearing ring fixed on the spindle, and in a groove in the outer bearing ring, the balls and the rollers are provided with cages which are interconnected in such a way that the roller cage has no substantial freedom of movement in an axial direction relative to the ball cage so that the roller cage and hence the rollers are axially located within the outer bearing ring.

This very simple expedient of interconnecting the ball and roller cages overcomes the problems inherent in the previous techniques for locating the rollers and is also both inexpensive to manufacture and simple to assemble.

The speeds of rotation of both the ball and roller cages depend upon the diameters of the spindle surfaces on which the balls and rollers roll and upon the diameters of the balls and rollers themselves. It is therefore possible to make the geometry of the assembly such that the cages rotate at the same speed as each other and when this is done the cages may be rigidly connected to each other or may be made integral with each other. For ease of manufacture and assembly, however, the geometry of the assembly is preferably such that there is a difference between the speeds of rotation of the two cages, although this difference is preferably kept as small as is practical, bearing in mind ease of manufacture and assembly, to reduce wear at the interconnection between the cages. When the assembly is such that the cages rotate at different speeds when the bearing is in use, the cages are separate from each other and have interlocking parts which prevent the roller cage from moving axially relative to the ball cage except for a small clearance of the interlocking parts, but allow the two cages to rotate relative to each other.

This freedom of relative rotation between the two cages is desirable since it allows the diameters of the paths of contact between the balls and the spindle and the rollers and the spindle to be of different lengths from each other.

When the cages are separate but interlocked, the interlocking parts preferably comprise two sleeves, one extending axially from each cage towards the other cage, together with a peripheral groove in one sleeve and a peripheral extension such as a rib or a series of peripheral teeth integral with the other sleeve and engaging in the peripheral groove.

In one example, both the cages are molded and each cage has its sleeve molded integrally with it and extending axially from it. The sleeve extending from the roller cage has an internal peripheral groove near its end remote from the cage and the ball cage sleeve, which may be of smaller axial length than that of the roller cage, has a circumferential rib projecting radially outwardly at its free end. The ball cage and sleeve are molded out of resilient plastics material and the rib is a snap fit in the internal groove of the roller cage sleeve. To facilitate snapping of the rib into the groove, the rib may be chamfered at its face remote from the ball cage and the end of the roller cage sleeve remote from the roller cage is also then internally chamfered to act as a lead-in for the chamfered edge of the rib.

The molding forming the roller cage and its sleeve is preferably made of glass filled nylon which is a relatively rigid material and the molding forming the ball cage and its sleeve is of nylon with no glass filling so that it has considerable resilience.

An example of an assembly constructed in accordance with the invention is illustrated in the accompanying drawings in which:

FIG. 1 is a diametric axial section through the assembly; and,

FIG. 2 is a section to a larger scale as seen in the direction of the arrows on the line II-II in FIG. 1 showing one of the rollers and adjacent parts of the roller cage.

The assembly shown in the drawings is intended for use in a water pump of the engine of a heavy motor vehicle such as a truck or bus and comprises a spindle 1 extending coaxially through an outer bearing ring 2 which, in use, is fixed in a bore in a casting forming part of the water pump. The spindle 1 has a groove 3 and the outer bearing ring 2 has an internal groove 4. A row of balls 5 fit in and are arranged to roll in the grooves 3 and 4 when the spindle 1 is turned. The balls 5 fit in the grooves 3 and 4 with a very close tolerance and accordingly locate the spindle 1 and the outer bearing ring 2 axially relative to each other.

Between the spindle 1 and the outer bearing ring 2 and spaced axially away from the row of balls 5 is a row of rollers 6. The clearance space between the spindle 1 and the outer bearing ring 2 is closed at both ends by conventional rotary oil seals 7.

The row of balls 5 are held spaced apart angularly from each other by a cage 8 which is made of nylon by an injection molding operation. The cage 8 has a sleeve 9 formed integrally with it and at the end of the sleeve 9 remote from the cage 8 is a radially outwardly projecting circumferential rib 10 which is also formed as an integral part of the molding. The rib 10 has a chamfered surface 11.

The row of rollers 6 are held spaced apart angularly from each other by a cage 12 which is molded out of glass filled nylon so that it is somewhat less resilient than the cage 8. A sleeve 13 is formed integrally with the cage 12 and forms an axial extension of it. Near its end remote from the cage 12, the sleeve 13 is formed with an internal annular groove 14 and beyond the groove 14 is an internal chamfer 15.

The rib 10 fits within the groove 14 into which it is able to be snapped owing to the resilience of the nylon of which it is molded and the provision of the chamfered surface 11 and the internal chamfer 15 in the sleeve 13. The groove 14 has an axial width 0.50 mm greater than the axial width of the rib 10 and the outer periphery of the rib 10 has a minimum radial clearance of 0.20 mm from the peripheral face of the groove 14. Thus the cages 8 and 12 are interconnected in such a way that they can only move through a maximum distance of 0.50 mm relative to each other, but they are able to rotate relative to each other. The row of balls 5 locate the cage 8 in an axial direction and this in turn locates the cage 12 and the row of rollers 6 axially between the spindle 1 and the outer bearing ring 2.

As is shown most clearly in FIG. 2, each of the rollers 6 fits in a slot 16 in the cage 12 and the side faces of the slot 16 are shaped as shown so that the clearance between the center parts of these faces is greater than the diameter of the roller 16, but the clearance between these faces and the inner and outer peripheries of the cage 12 is slightly less than the diameter of the roller 6. Because of this it is necessary to snap each of the rollers 6 into its slot 16 in the cage 12 and thus, when snapped in position, the rollers are retained in the cage 12 so that the cage 12 and the rollers 6 form a sub-assembly which is subsequently assembled as a unit with the remaining parts of the spindle and bearing assembly as a whole.

In use, the clearance between the spindle 1 and the outer bearing ring 2 adjacent the row of balls 5 and the row of rollers 6 is packed with grease with is retained by the oil seals 7.

What we claim is:

1. A spindle and bearing assembly comprising, a row of balls and a row of rollers which are spaced apart from each other axially along the spindle, said balls and rollers having a common outer bearing ring, the balls being arranged to roll between a first fixed radial groove about said spindle and a second fixed radial groove in said outer bearing ring, said balls and said rollers having a ball cage and a roller cage respectively, each of said cages being interconnected such that said roller cage has no substantial freedom of movement in an axial direction relative to said ball cage, whereby said roller cage and hence said rollers are axially located within the outer bearing ring.

2. An assembly according to claim 1, in which said ball cage and roller cage are separate from each other and have interlocking parts which prevent said roller cage from moving axially relative to said ball cage except for a small clearance of said interlocking parts, said two cages being rotatable relative to each other.

3. An assembly according to claim 2, in which the interlocking parts comprise two sleeves, one extendng axially from each cage towards the other cage, together with a peripheral groove in one sleeve and a peripheral extension integral with the other sleeve and engaging in said peripheral groove.

4. An assembly according to claim 3, in which both cages are molded and each cage has its sleeve molded integrally with it, the sleeve extending from said roller cage having internally said peripheral groove near its end remote from said roller cage, and said ball cage sleeve having said circumferential extension projecting radially outwardly at its free end.

5. An assembly according to claim 4, in which said ball cage and sleeve are molded out of resilient plastic material and said extension is a snap fit in the internal groove of said roller cage sleeve.

6. An assembly according to claim 5, in which said extension is a rib chamfered at its face remote from said ball cage and the end of said roller cage sleeve remote from said roller cage is internally chamfered to act as a lead-in for the chamfered edge of said rib.

7. An assembly according to claim 5, in which said roller cage and its sleeve are made of glass filled nylon and said ball cage and its sleeve are of nylon with no glass filling.

8. The assembly of claim 5, in which said extension is a plurality of teeth chamfered at its face remote from said ball cage and the end of said roller cage sleeve remote from said roller cage is internally chamfered to act as a lead-in for the chamfered edge of said plurality of teeth.

9. The assembly of claim 1, wherein said first fixed radial groove is formed in the outer surface of said spindle.

10. The assembly of claim 1, wherein said first fixed radial groove is formed in an inner bearing ring fixed on said spindle.

* * * * *

UNITED STATES PATENT AND TRADEMARK OFFICE
CERTIFICATE OF CORRECTION

PATENT NO. : 3,926,484

DATED : December 16, 1975

INVENTOR(S) : Derek Ray Parkins

It is certified that error appears in the above—identified patent and that said Letters Patent are hereby corrected as shown below:

Column 3, line 37, after "grease" delete "with" and substitute --which--.

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*